(12) United States Patent
Hirazumi (10) Patent No.: US 12,522,303 B2
(45) Date of Patent: Jan. 13, 2026

(54) FIXING STRUCTURE FOR PIPE NUT

(71) Applicant: SUBARU CORPORATION, Tokyo (JP)

(72) Inventor: Kyosuke Hirazumi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 19/019,876

(22) Filed: Jan. 14, 2025

(65) Prior Publication Data
US 2025/0276741 A1    Sep. 4, 2025

(30) Foreign Application Priority Data

Mar. 4, 2024 (JP) ................................ 2024-032377

(51) Int. Cl.
| | | |
|---|---|---|
| *B62D 27/06* | (2006.01) | |
| *B62D 21/11* | (2006.01) | |
| *B62D 27/02* | (2006.01) | |
| *F16B 7/18* | (2006.01) | |

(52) U.S. Cl.
CPC ......... *B62D 27/065* (2013.01); *B62D 27/023* (2013.01); *F16B 7/18* (2013.01); *B62D 21/11* (2013.01)

(58) Field of Classification Search
CPC .... B62D 27/065; B62D 27/023; B62D 21/11; F16B 7/18
See application file for complete search history.

(56) References Cited

U.S. PATENT DOCUMENTS

| | | | | |
|---|---|---|---|---|
| 6,877,754 B2 * | 4/2005 | Kim | ...................... | B62D 21/11 |
| | | | | 280/124.109 |
| 7,393,015 B1 * | 7/2008 | Gillespie | ................ | B62D 21/11 |
| | | | | 180/312 |

(Continued)

FOREIGN PATENT DOCUMENTS

| | | | |
|---|---|---|---|
| JP | 2008208619 A | * | 9/2008 |
| JP | 2011-230602 A | | 11/2011 |

(Continued)

OTHER PUBLICATIONS

JP-2008208619-A (machine translation) (Year: 2008).*

(Continued)

*Primary Examiner* — Jason D Shanske
*Assistant Examiner* — Joselynn Y Sliteris
(74) *Attorney, Agent, or Firm* — TROUTMAN PEPPER LOCKE LLP (57) ABSTRACT

A fixing structure includes an insertion hole, a slit, a first stopper, and a second stopper. The insertion hole is provided in a vehicle body frame. A pipe nut main body is inserted through the insertion hole so as to be rotatable. The slit is provided in the vehicle body frame and extends from the insertion hole. The first stopper is provided at a base end of the pipe nut main body and abuts on an outer surface of the vehicle body frame to restrict movement of the pipe nut main body in a longitudinal direction. The second stopper extends from a side surface of the pipe nut main body, passes through the slit, and is disposed inside the vehicle body frame. The second stopper is joined to an inner surface of the vehicle body frame at a position rotated around the central axis from the slit.

8 Claims, 9 Drawing Sheets

(56) References Cited

U.S. PATENT DOCUMENTS

| | | | | |
|---|---|---|---|---|
| 8,702,362 | B2* | 4/2014 | Zhu | F16B 33/002 |
| | | | | 411/389 |
| 9,505,295 | B2* | 11/2016 | Watanabe | B62D 25/082 |
| 9,650,074 | B2* | 5/2017 | Shirooka | B62D 25/082 |
| 9,751,565 | B2* | 9/2017 | Tatsuwaki | B62D 21/11 |
| 11,745,800 | B2* | 9/2023 | Noguchi | B62D 21/155 |
| | | | | 296/187.11 |

FOREIGN PATENT DOCUMENTS

| | | | | | |
|---|---|---|---|---|---|
| KR | 100692752 | B1 | * | 3/2007 | B62D 21/02 |
| KR | 20070028949 | A | * | 3/2007 | B62D 21/02 |
| KR | 20130068727 | A | * | 6/2013 | B62D 21/08 |

OTHER PUBLICATIONS

KR-100692752-B1 (machine translation) (Year: 2007).*
KR-20070028949-A (machine translation) (Year: 2007).*
KR-20130068727-A (machine translation) (Year: 2013).*

* cited by examiner

FIXING STRUCTURE FOR PIPE NUT

CROSS-REFERENCE TO RELATED APPLICATION

The present application claims priority from Japanese Patent Application No. 2024-032377 filed on Mar. 4, 2024, the entire contents of which are hereby incorporated by reference.

BACKGROUND

The disclosure relates to a fixing structure for a pipe nut provided on a vehicle body frame for fastening a sub frame to the vehicle body frame by a bolt.

Conventionally, front side frames extending in a front-rear direction are disposed as vehicle body frames on both sides of a front portion of a vehicle body of an automobile or the like, for example. On lower portions of the front side frames, for example, a suspension cross member that supports suspensions and the like is extended in the vehicle width direction as a sub frame.

Both ends of such a suspension cross member are generally attached to each of the front side frames by bolt fastening. Therefore, in order to fasten both ends of the suspension cross member to each of the front side frames by bolts, a pipe nut having a female screw portion therein is joined to the front side frame.

As such a fixing structure for increasing the attachment rigidity of the pipe nut, various techniques have been conventionally proposed.

For example, Japanese Unexamined Patent Application Publication No. 2011-230602 discloses a structure in which a reinforcing member for suppressing tilting of a pipe nut is provided, and the reinforcing member is joined to an inner surface of a vehicle body frame to fix the pipe nut. Such a reinforcing member can also increase the rigidity of the vehicle body frame, in addition to increasing the attachment rigidity of the pipe nut.

In the case of such a fixing structure, it is common to weld the reinforcing member to the inner surface of the vehicle body frame in a state where the pipe nut and the reinforcing member are sub-assembled.

In order to further improve the attachment rigidity with respect to such a fixing structure in which welding is performed just from an inside of the vehicle body frame, it is preferable to perform welding also from an outside of the vehicle body frame.

As a fixing structure for improving the attachment rigidity of such a pipe nut, a fixing structure is also conceivable in which a flange to be welded in contact with an outer surface of the vehicle body frame is provided at a lower end of the pipe nut.

SUMMARY

An aspect of the disclosure provides a fixing structure. The fixing structure is for a pipe nut that fixes a pipe nut main body to a vehicle body frame having a hollow cross section. The fixing structure includes an insertion hole, a slit, a first stopper, and a second stopper. The insertion hole is provided in the vehicle body frame and through which the pipe nut main body is inserted in such a manner that the pipe nut main body is rotatable around a central axis of the pipe nut main body. The slit is provided in the vehicle body frame and extends from the insertion hole. The first stopper is provided at a base end of the pipe nut main body and abuts on an outer surface of the vehicle body frame to restrict movement of the pipe nut main body in a longitudinal direction. The second stopper extends from a side surface of the pipe nut main body, passes through the slit, and is disposed inside the vehicle body frame. The second stopper is joined to an inner surface of the vehicle body frame at a position rotated around the central axis from the slit.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

In the fixing structure, it may be difficult to sub-assemble the pipe nut and the reinforcing member. In this case, assemblability may be deteriorated.

It is desirable to provide a fixing structure for a pipe nut capable of ensuring the attachment rigidity of the pipe nut with respect to a vehicle body frame, enhancing assemblability, and further enhancing the rigidity of the vehicle body frame.

Hereinafter, embodiments of the disclosure will be described with reference to the drawings.

Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Further, in the following description, in a case where "joining" is described, the joining method is performed using a joining means represented by fusion welding, mechanical joining, or the like. Note that, in the drawings, a spot welding symbol is attached to a spot welding point, and display of the welding symbol is omitted in other welding points.

Figure 1:
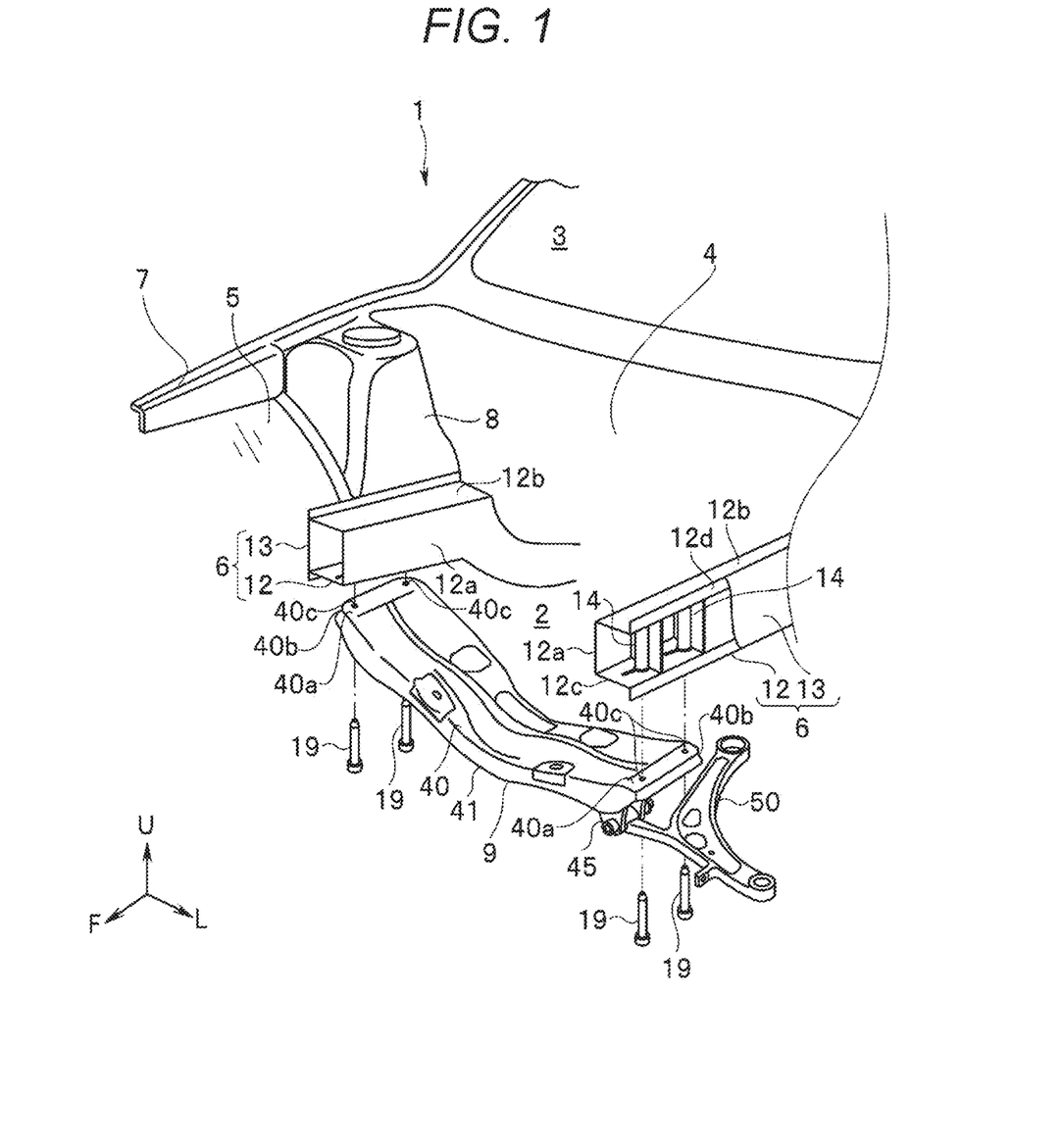
FIG. 1 is an exploded perspective view of a vehicle body frame and a suspension cross member according to an embodiment.

As illustrated in FIG. 1, an engine room 2 is provided in a front portion of the vehicle body 1.

The engine room 2 is partitioned from the rear cabin 3 by a toe board 4.

As frames constituting such an engine room 2, the vehicle body 1 includes a pair of left and right front side frames 6, a pair of left and right upper side frames 7, and a suspension cross member 9. These frames are formed by, for example, pressing a sheet metal member made of a high-strength steel plate or the like.

Note that the basic structure around the pair of left and right front side frames 6 and the pair of left and right upper side frames 7 is bilaterally symmetrical. Therefore, the left side of the vehicle body will be described below as an example.

As illustrated in FIG. 1, the front side frames 6 extend from a lower portion of the toe board 4 toward the front of the vehicle body 1 on outsides of the toe board 4 in a vehicle width direction.

The upper side frames 7 are provided above the front side frames 6 and outside the front side frames 6 in the vehicle width direction. The upper side frames 7 extend forward of the vehicle body along the engine room 2.

A suspension tower 8 is provided between each of the front side frames 6 and each of the upper side frames 7 near the rear of the engine room 2.

The suspension tower 8 houses a suspension device (not illustrated) therein. The suspension tower 8 supports an upper portion of the suspension device.

Furthermore, a wheel apron 5 is provided between each of the front side frames 6 and each of the upper side frames 7 in front of the suspension tower 8.

The suspension cross member 9 is disposed as a sub frame on lower portions of the front side frames 6. That is, the suspension cross member 9 extends in the vehicle width direction at the lower portions of the front side frames 6. The suspension cross member 9 has a shape in which a central portion is curved downward.

Ends of the suspension cross member 9 in the vehicle width direction are joined to bottom surfaces of the front side frames 6 by bolt fastening.

In order to fasten such a suspension cross member 9 by bolts, the front side frames 6 as a vehicle body frame are each provided with a pair of front and rear pipe nuts 14.

The configurations of the front side frames 6 and the suspension cross member 9 will be described in detail below.

Figure 2:
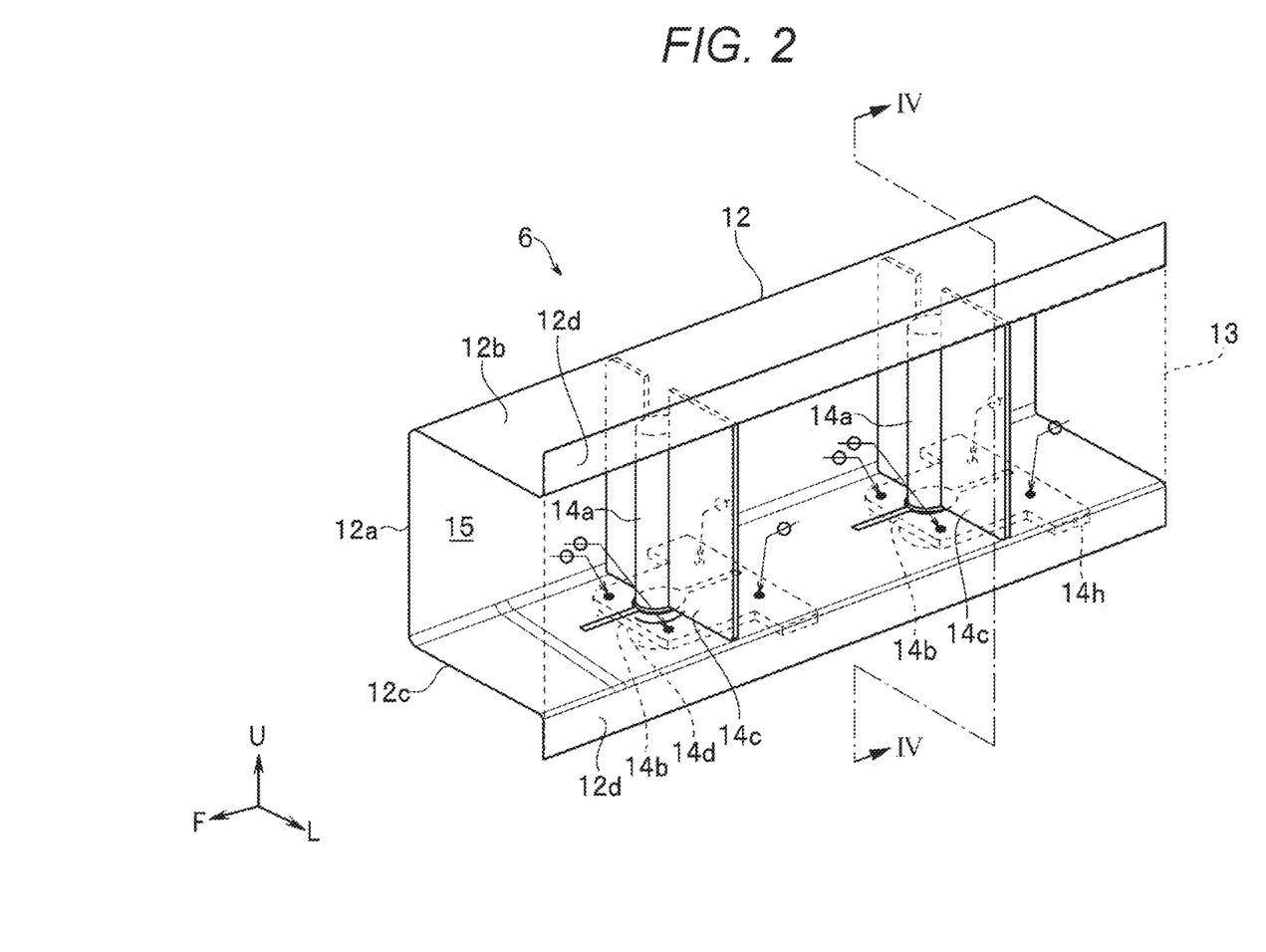
FIG. 2 is an enlarged perspective view of a main part of the vehicle body frame according to the embodiment.

As illustrated in FIGS. 1 and 2, the front side frames 6 each include an inner frame 12 and an outer frame 13. Note that, in FIG. 1, a part of the outer frame 13 of the left front side frame 6 is omitted.

Figure 3:
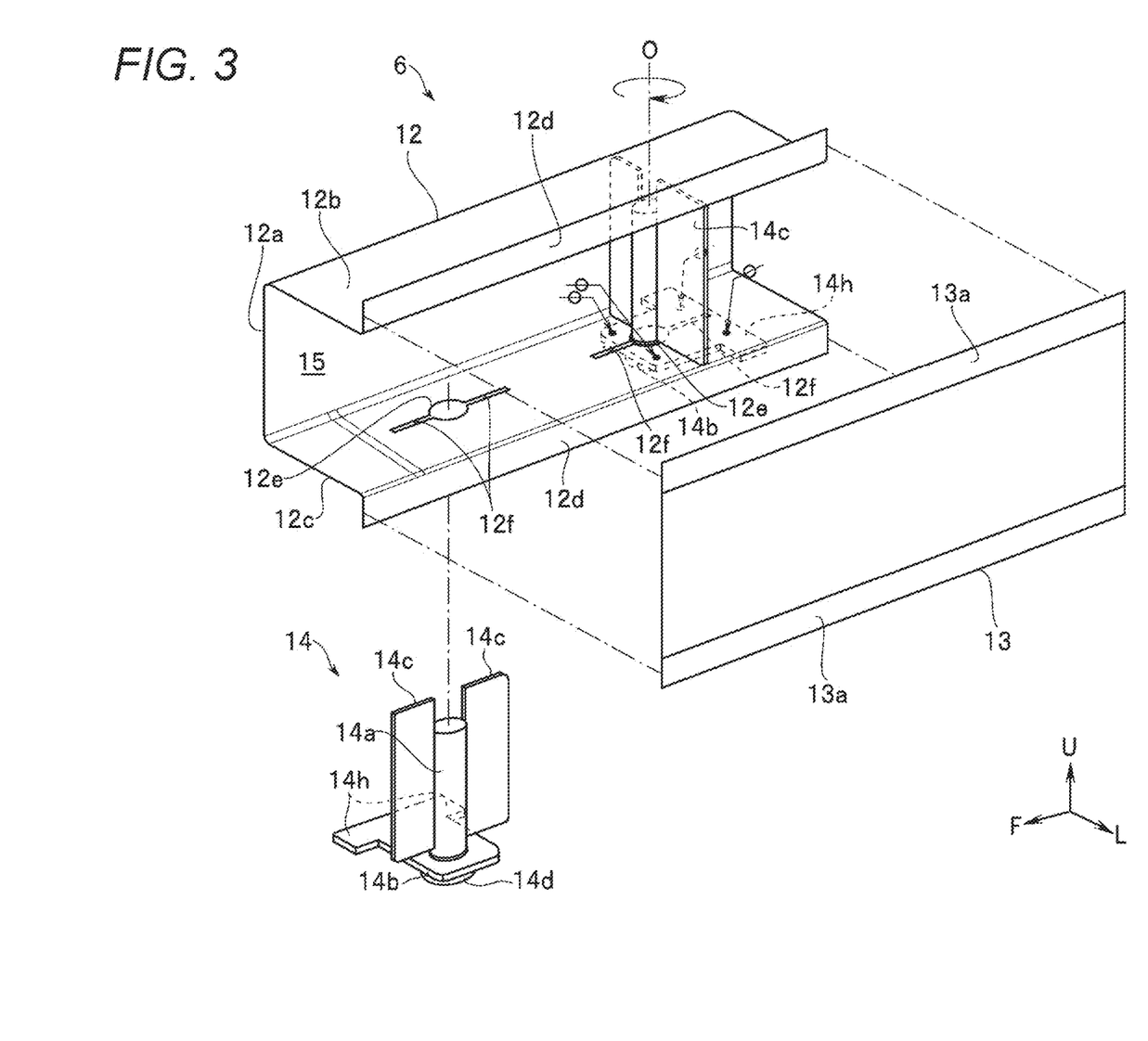
FIG. 3 is an enlarged exploded perspective view of the main part of the vehicle body frame according to the embodiment.
Figure 4:
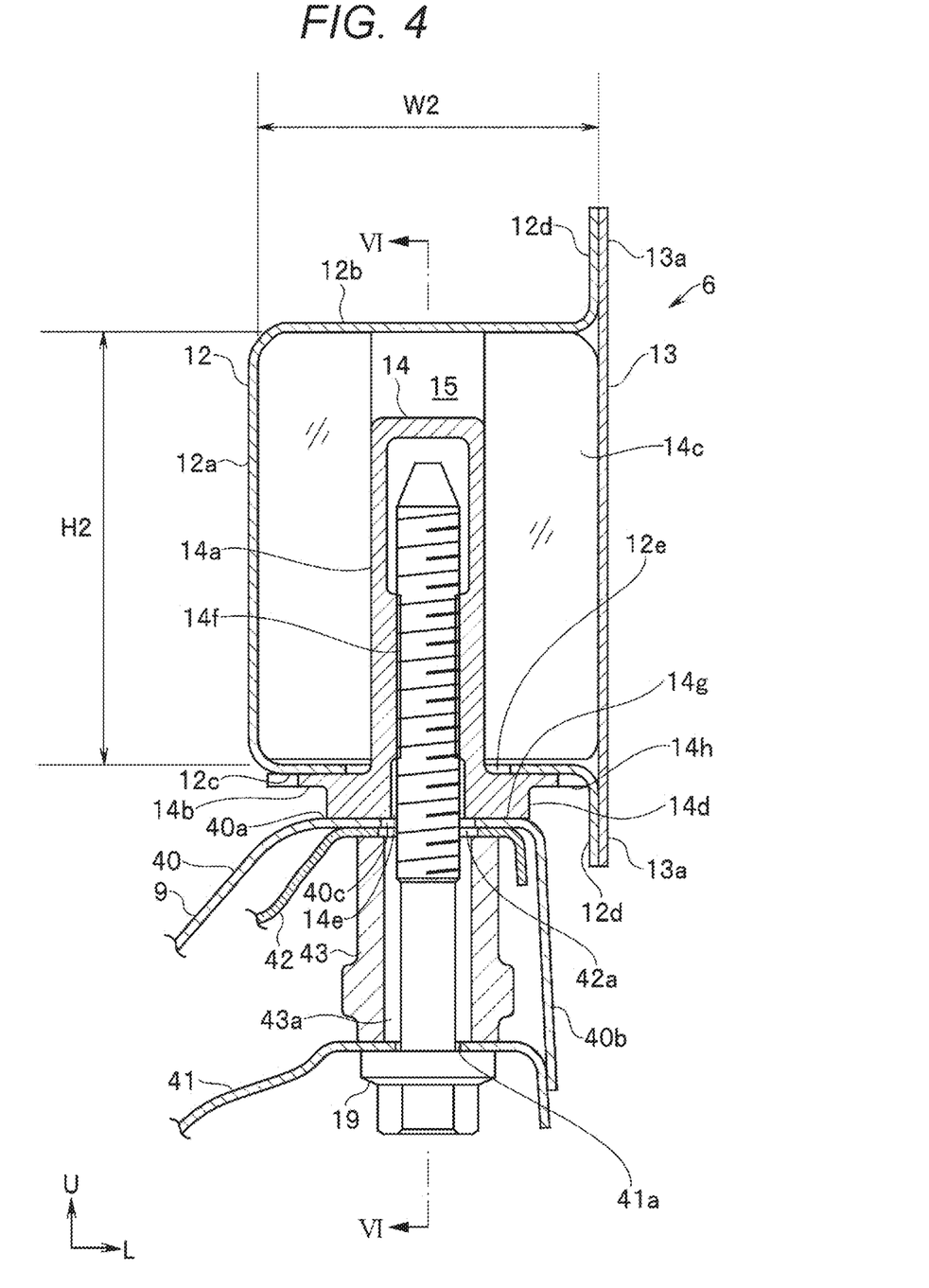
FIG. 4 is a cross-sectional view taken along line IV-IV of FIG. 2 according to the embodiment.

As illustrated in FIGS. 2 to 4, the inner frame 12 has a substantially hat-shaped cross section protruding inward in the vehicle width direction. Such an inner frame 12 includes an inner wall 12a, an upper wall 12b, a lower wall 12c, and a pair of upper and lower inner flanges 12d.

The inner wall 12a extends in the vehicle body vertical direction.

The upper wall 12b and the lower wall 12c extend outward in the vehicle width direction from both ends of the inner wall 12a.

The pair of upper and lower inner flanges 12d protrudes in the vehicle body up-down direction from an outer surface of the inner frame 12. For example, the upper wall 12b and the lower wall 12c extend in the vehicle body up-down direction from outer edges in the vehicle width direction. Each of the inner flanges 12d functions as a flange for joining the inner frame 12 to the outer frame 13. Further, the inner flange 12d extending from the lower wall 12c also serves as an abutting portion of a pair of rotation restricting portions 14h described later.

As illustrated in FIGS. 2 to 4, the outer frame 13 is disposed at a position facing the outside of the inner frame 12 in the vehicle width direction. The outer frame 13 is a flat plate that closes the opening of the inner frame 12.

Therefore, the outer frame 13 has a pair of upper and lower outer flanges 13a at positions facing the inner flanges 12d.

Such an outer frame 13 is joined in a state where the outer flanges 13a are made to abut on the inner flanges 12d.

Thus, as illustrated in FIG. 4, the front side frame 6 has a substantially rectangular cross section having a hollow cross section 15.

With respect to the front side frame 6, the pair of front and rear pipe nuts 14 can be inserted into the lower wall 12c. Therefore, the lower wall 12c is provided with insertion holes for inserting the respective pipe nuts 14.

For example, as illustrated in FIG. 3, the lower wall 12c is provided with a pair of front and rear lower insertion holes 12e. Furthermore, the lower wall 12c is provided with a pair of front and rear slits 12f extending from each of the lower insertion holes 12e in the front-rear direction of the vehicle body. Note that the slits 12f are provided for inserting a pair of reinforcing plates 14c to be described later.

Figure 5:
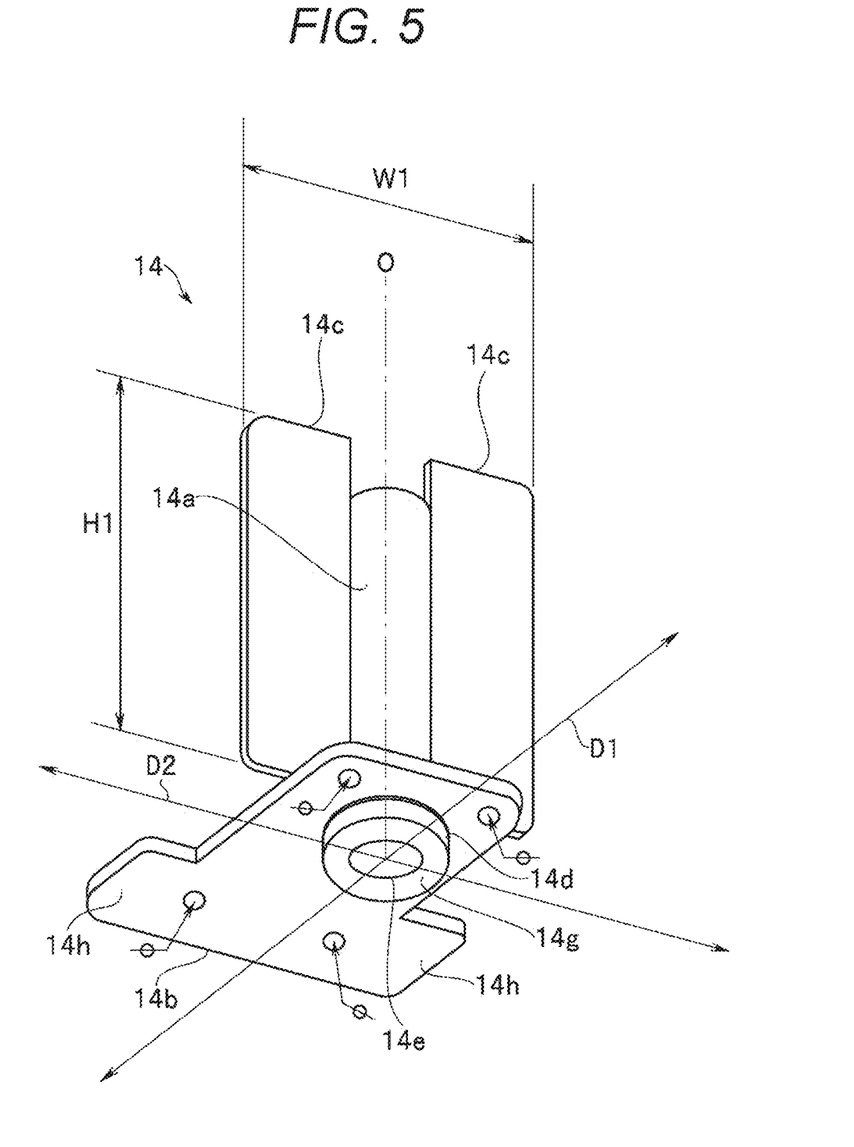
FIG. 5 is a perspective view of a pipe nut according to the first embodiment from an obliquely lower side.

As illustrated in FIG. 5, the pipe nut 14 inserted into each set of the lower insertion holes 12e and the slits 12f includes a pipe nut main body 14a, joining flanges 14b, and a pair of reinforcing plates 14c.

Figure 6:
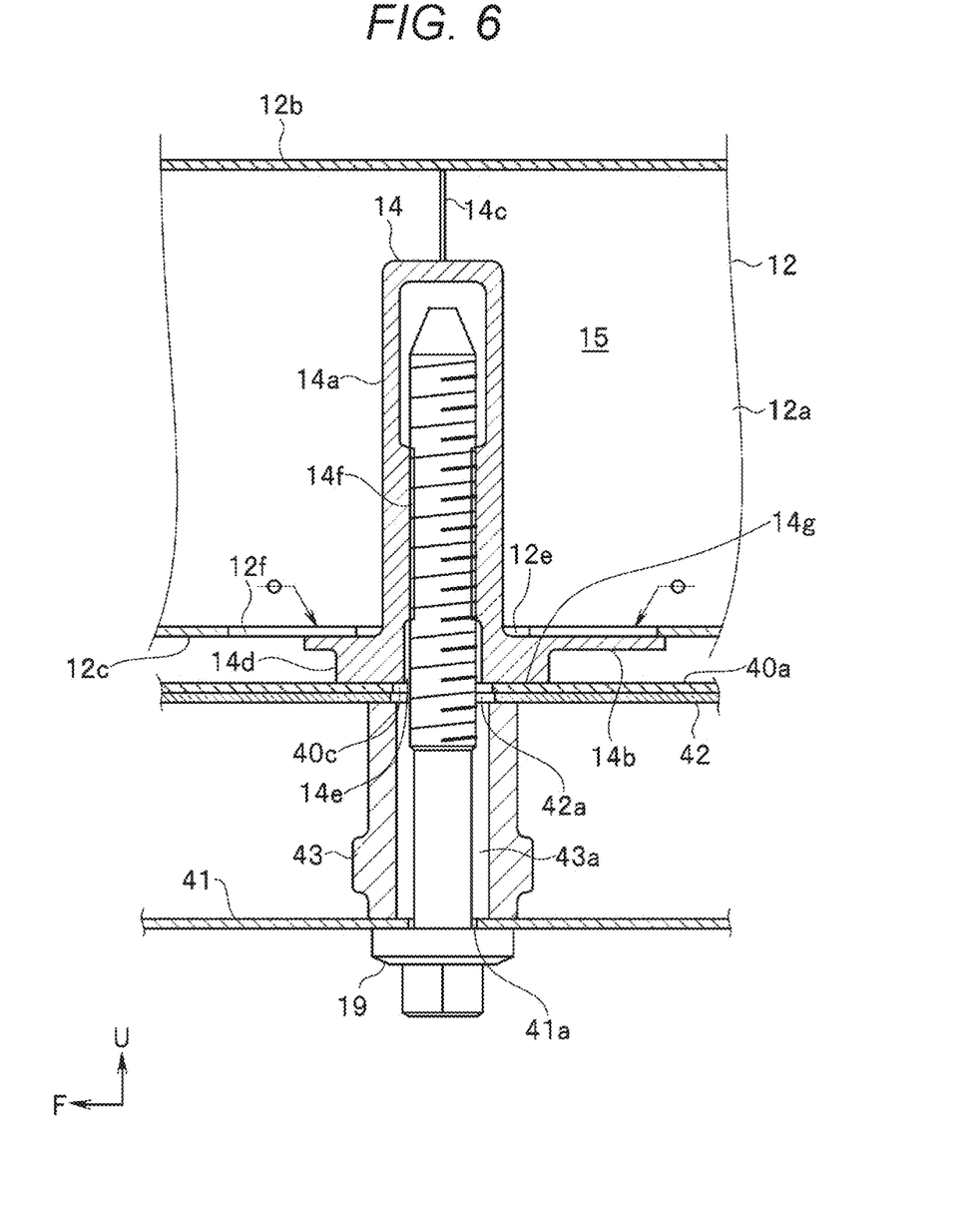
FIG. 6 is a cross-sectional view taken along line VI-VI of FIG. 4 according to the embodiment.

As illustrated in FIGS. 4 and 6, the pipe nut main body 14a has, for example, a substantially cylindrical shape with one end closed. The hole formed in the pipe nut main body 14a is set as a bolt insertion hole 14e. Furthermore, a female screw portion 14f is formed on an inner peripheral surface of the bolt insertion hole 14e. Note that a bolt 19 to be described later can be screwed into the female screw portion 14f. The outer diameter of the pipe nut main body 14a is set slightly smaller than the inner diameter of the lower insertion hole 12e. Thus, the pipe nut main body 14a can be inserted into the lower insertion hole 12e. Furthermore, the pipe nut main body 14a inserted into the lower insertion hole 12e is rotatable around a central axis O of the pipe nut main body 14a.

The joining flange 14b is provided at a base end of the pipe nut main body 14a. As illustrated in FIG. 5, the basic shape of the joining flange 14b is, for example, a rectangular flat plate shape. Such a joining flange 14b extends in a direction orthogonal to the central axis O of the pipe nut main body 14a. In one embodiment, the joining flange 14b serves as a "first stopper" that restricts movement of the pipe nut main body 14a in a longitudinal direction when abutting on the outer surface of the lower wall 12c.

Furthermore, the extended portion of the joining flange 14b serves as a welded portion with the lower wall 12c. That is, the joining flange 14b allows spot-welding of four corners of the joining flange 14b in a state of being in contact with the outer surface of the lower wall 12c.

Note that, in the following description, for convenience, as illustrated in FIG. 5, a direction orthogonal to the central axis O and in which the long side of the joining flange 14b extends is defined as a first direction D1. Further, a direction orthogonal to the central axis O and orthogonal to the first direction D1 is defined as a second direction D2.

Such a joining flange 14b is provided with rotation restricting portions 14h protruding from the pair of long sides in the second direction D2. The protrusion amount of each rotation restricting portion 14h in the second direction D2 is set based on the distance from the lower insertion hole 12e of the front side frame 6 to the inner flange 12d. For example, as illustrated in FIG. 3, when the pipe nut main body 14a is inserted into the lower insertion hole 12e and the joining flange 14b is disposed so that the first direction D1 coincides with a longitudinal direction of the front side frame 6, any one of the pair of rotation restricting portions 14h is set to abut on the inner flange 12d. Thus, each rotation restricting portion 14h can restrict rotation of the pipe nut main body 14a inserted into the lower insertion hole 12e.

Further, as illustrated in FIG. 5, a boss portion 14d protruding downward is formed at a lower end of the joining flange 14b.

The boss portion 14d is formed in an annular shape. A bearing surface 14g is provided on a protrusion surface of the boss portion 14d.

As illustrated in FIGS. 4 and 6, an upper surface of the suspension cross member 9 can abut on the bearing surface 14g. That is, the bearing surface 14g functions as an attachment surface when the suspension cross member 9 is fasten by bolts. Therefore, the bearing surface 14g is substantially flat.

As illustrated in FIG. 5, each of the pair of reinforcing plates 14c is formed by, for example, a flat plate having a substantially rectangular shape in front view. Each reinforcing plate 14c is provided on a side surface of the pipe nut main body 14a. These reinforcing plates 14c are provided at positions that are rotationally symmetric with respect to the central axis O of the pipe nut main body 14a. Furthermore, on the side surface of the pipe nut main body 14a, each of the reinforcing plates 14c is disposed so that a plate surface extends in the central axis O direction and the second direction D2.

A height dimension H1 of each of the reinforcing plates 14c is set to be substantially the same as a height dimension H2 in an internal space of the front side frame 6 in the direction of the central axis O of the pipe nut main body 14a (see FIGS. 4 and 5).

Further, in the second direction D2, a width dimension W1 from an extending end of one of the reinforcing plates 14c to an extending end of the other of the reinforcing plates 14c is set substantially equal to a width dimension W2 in the vehicle width direction in the internal space of the front side frame 6 (see FIGS. 4 and 5).

Here, a gap wider than at least the plate thickness of the lower wall 12c is provided between the base end of each of the reinforcing plates 14c and the joining flange 14b. Further, the dimension of each slit 12f in the front-rear direction of the vehicle body through which each reinforcing plate 14c is inserted is set slightly larger than the dimension of each reinforcing plate 14c in the second direction D2. Furthermore, the size of each slit 12f in the vehicle width direction through which each reinforcing plate 14c is inserted is set to be slightly larger than the thickness of each reinforcing plate 14c.

Thus, each reinforcing plate 14c can be inserted into each slit 12f. Furthermore, each of the reinforcing plates 14c inserted into each of the slits 12f is disposed inside the front side frame 6 and is rotatable around the central axis O of the pipe nut main body 14a.

Next, a procedure for assembling such a pipe nut 14 to the front side frame 6 will be described. The pipe nut 14 is assembled to the inner frame 12 before the outer frame 13 is welded.

First, as illustrated in FIG. 3, an assembly worker (hereinafter, the worker) aligns the pipe nut 14 below the inner frame 12 so that the central axis O of the pipe nut main body 14a coincides with the center of the lower insertion hole 12e. At this time, the worker performs adjustment so that the first direction D1 of the pipe nut 14 coincides with the vehicle width direction of the inner frame 12.

Thus, each of the reinforcing plates 14c is positioned at a position where the reinforcing plate can be inserted into each of the slits 12f.

In such a state, the worker inserts the pipe nut main body 14a and the reinforcing plates 14c into the lower insertion hole 12e and the slits 12f.

Then, when the joining flange 14b abuts on the outer surface of the lower wall 12c, the worker rotates the joining flange 14b. The joining flange 14b is rotated to a position where any one of the rotation restricting portions 14h abuts on the inner flange 12d. That is, the inner flange 12d restricts rotation of the pipe nut 14 by abutting on the rotation restricting portion 14h. In one embodiment, the inner flange 12d may serve as a "first protrusion" for restricting the rotation of the pipe nut 14.

Thus, the first direction D1 of the pipe nut 14 coincides with the front-rear direction of the vehicle body of the inner frame 12. That is, when the rotation restricting portion 14h is made to abut on the inner flange 12d, each of the reinforcing plates 14c extends in a direction orthogonal to the longitudinal direction of the inner frame 12.

At this time, an edge on a base end side of each of the reinforcing plates 14c is made to abut on an inner surface of the lower wall 12c. Therefore, the pipe nut 14 is prevented from falling off from the inner frame 12.

Furthermore, edges of one of the reinforcing plate 14c abut on inner surfaces of the inner wall 12a and the upper wall 12b. Further, an edge of the other of the reinforcing plates 14c abuts on the inner surface of the upper wall 12b.

In such a state, the worker joins the reinforcing plates 14c to the inner surfaces of the inner wall 12a and the upper wall 12b by arc welding. Furthermore, the worker joins the joining flange 14b to the outer surface of the lower wall 12c by spot welding. Thus, the pipe nut 14 is assembled to the inner frame 12.

Then, the worker joins the inner flanges 12d of the inner frame 12 in a state where the outer flanges 13a of the outer frame 13 are made to abut on the inner flanges.

Note that some or all of the assembling work can be performed by a machine tool instead of the worker.

As illustrated in FIGS. 2, 4, and 6, the pipe nut main body 14a assembled to the inside of the front side frame 6 is joined to inner surfaces of the front side frame 6 with the reinforcing plates 14c interposed therebetween in a state of being supported by the reinforcing plates 14c. Thus, each of the reinforcing plates 14c can restrict movement of the pipe nut main body 14a in a prying direction (direction inclined with respect to the central axis) and the longitudinal direction. As described above, in the present embodiment, each of the reinforcing plates 14c corresponds to an example as a second stopper.

Furthermore, each of the reinforcing plates 14c extends in a direction orthogonal to the longitudinal direction of the front side frame 6 inside the front side frame 6. Each of such reinforcing plates 14c also serves as a reinforcing member for reinforcing the front side frame 6 inside the front side frame 6.

As illustrated in FIGS. 1, 4, and 6, the suspension cross member 9 includes an upper panel 40, a lower panel 41, and a reinforcement 42.

The upper panel 40 has, for example, an open cross-sectional shape whose cross section is open toward the lower side of the vehicle body. As illustrated in FIG. 4, such an upper panel 40 includes an attachment portion 40a and a side wall 40b.

The attachment portion 40a is disposed at a position facing the lower wall 12c. The attachment portion 40a abuts on the bearing surface 14g of the pipe nut 14 and functions as an attachment portion for fixing the suspension cross member 9 to the front side frame 6.

Thus, the attachment portion 40a has a pair of front and rear first bolt insertion holes 40c.

The pair of front and rear first bolt insertion holes 40c is provided at positions facing the respective bolt insertion holes 14e. That is, the first bolt insertion holes 40c and the bolt insertion holes 14e are arranged substantially coaxially.

The side wall 40b extends downward from an outer edge of the attachment portion 40a in the vehicle width direction.

The lower panel 41 is disposed at a position facing the upper panel 40 with a space therebetween. The lower panel 41 is provided with a second bolt insertion hole 41a at a position facing each of the first bolt insertion holes 40c. That is, the second bolt insertion holes 41a and the first bolt insertion holes 40c are arranged substantially coaxially.

The outer edge of the lower panel 41 in the vehicle width direction is bent downward. In this manner, a lower end of the side wall 40b of the upper panel 40 is joined to an outer surface of the bent lower panel 41 in the vehicle width direction.

By joining the upper panel 40 and the lower panel 41, an internal space is formed in the suspension cross member 9.

The reinforcement 42 is disposed inside the suspension cross member 9. For example, the reinforcement 42 extends in the vehicle width direction along the upper panel 40.

As illustrated in FIG. 4, the outer end of the reinforcement 42 in the vehicle width direction is in contact with the inner surface of the attachment portion 40a. Then, an outer end of the reinforcement 42 in the vehicle width direction is joined to the attachment portion 40a.

Further, the joint portion of the reinforcement 42 is provided with a third bolt insertion hole 42a at a position facing each first bolt insertion hole 40c. That is, each third bolt insertion hole 42a and each of the first and second bolt insertion holes 40c and 41a are arranged substantially coaxially.

As illustrated in FIGS. 4 and 6, a pair of front and rear spacers 43 is extended between the reinforcement 42 and the lower panel 41.

The pair of front and rear spacers 43 has a substantially cylindrical shape. The hole formed in each spacer 43 is set as a fourth bolt insertion hole 43a penetrating in the vehicle body vertical direction. That is, the fourth bolt insertion hole 43a of each spacer 43 is disposed substantially coaxially with each of the first to third bolt insertion holes 40c, 41a, and 42a.

A bolt 19 can be inserted into the first to fourth bolt insertion holes 40c, 41a, 42a, and 43a arranged in this manner.

Note that, in the following description, the first to fourth bolt insertion holes 40c, 41a, 42a, and 43a are collectively referred to as a bolt insertion hole H.

With such a configuration, the suspension cross member 9 is fixed to the front side frame 6 by bolt fastening.

For example, when the suspension cross member 9 is fixed to the front side frame 6, the attachment portion 40a abuts on each of the bearing surfaces 14g from below.

Further, each of the bolt insertion holes H is positioned with respect to the bolt insertion hole 14e of each of the pipe nuts 14.

The bolt 19 is inserted into the bolt insertion hole H and the bolt insertion hole 14e of each set positioned from below the bolt insertion hole H. Then, each bolt 19 is screwed into the female screw portion 14f of the pipe nut 14. Thus, the suspension cross member 9 is fixed to the front side frame 6 by fastening.

An arm support portion 45 is provided on the outside in the vehicle width direction of the suspension cross member 9 fixed in this manner.

For example, as illustrated in FIG. 1, the arm support portion 45 protrudes downward from a bottom surface on the outside in the vehicle width direction of the lower panel 41. A base end of a suspension lower arm 50 is pivotally supported by the arm support portion 45. Thus, a distal end side of the suspension lower arm 50 is swingable in the vertical direction.

A lower portion of a suspension device, which is not illustrated, is supported outside the suspension lower arm 50 in the vehicle width direction. Furthermore, a wheel hub, which is not illustrated, for fixing the front wheel is rotatably supported on the outside in the vehicle width direction of the suspension lower arm 50.

According to such an embodiment, the fixing structure for the pipe nut 14 is a fixing structure for the pipe nut 14 that fixes the pipe nut main body 14a to the front side frame 6 having the hollow cross section 15, and includes the lower insertion hole 12e provided in the front side frame 6 and through which the pipe nut main body 14a is inserted in a state of being rotatable around the central axis O of the pipe nut main body 14a, the slit 12f provided in the front side frame 6 and extending from the lower insertion hole 12e, the joining flange 14b that is provided at the base end of the pipe nut main body 14a and abuts on an outer surface of the front side frame 6 to restrict movement of the pipe nut main body 14a in the longitudinal direction, and the reinforcing plate 14c extending from the side surface of the pipe nut main body 14a and disposed inside the front side frame 6 through the slit 12f, and the reinforcing plate 14c is joined to the inner surface of the front side frame 6 at a position rotated around the central axis O from the slit 12f. With these configurations, the fixing structure for the pipe nut 14 can ensure the attachment rigidity of the pipe nut 14 with respect to the vehicle body frame, enhance assemblability, and further enhance the rigidity of the vehicle body frame.

That is, in the present embodiment, the pair of reinforcing plates 14c disposed inside the front side frame 6 extends from the side surface of the pipe nut main body 14a. Further, the front side frame 6 is provided with the lower insertion hole 12e through which the pipe nut main body 14a is inserted. Furthermore, the front side frame 6 is provided with the pair of front and rear slits 12f extending from the lower insertion hole 12e.

With these configurations, the fixing structure for the pipe nut 14 of the present embodiment can be inserted into the front side frame 6 even if each reinforcing plate 14c extends to the pipe nut main body 14a. Thus, in a state where the pipe nut main body 14a and the reinforcing plates 14c are inserted into the front side frame 6, the reinforcing plates 14c can be easily disposed inside the front side frame 6 just by rotating the joining flange 14b around the central axis O of the pipe nut main body 14a. Thus, the assemblability can be enhanced as compared with a case where the reinforcing member is assembled after the pipe nut main body 14a is inserted into the front side frame 6.

Then, the reinforcing plates 14c are joined in a state where the edges of the reinforcing plates 14c are brought into contact with the inner surface of the front side frame 6.

For example, the edges of the reinforcing plates 14c are firmly joined by arc welding in a state of being in contact with inner surfaces of the inner frame 12. That is, the pipe nut main body 14a is firmly joined to the inner surfaces of the front side frame 6 with the reinforcing plates 14c interposed therebetween in a state of being supported by the reinforcing plates 14c. Thus, the reinforcing plates 14c can generate a sufficient drag against a load in the prying direction (direction inclined with respect to the central axis) and the longitudinal direction input to the pipe nut main body 14a via the suspension cross member 9 during traveling. Therefore, the fixing structure for the pipe nut 14 can ensure the attachment rigidity of the pipe nut 14 from the inside of the front side frame 6.

In addition, as described above, the reinforcing plates 14c can be disposed inside the front side frame 6 by being inserted integrally with the pipe nut main body 14a from below the front side frame 6. Therefore, even if the joining flange 14b is provided at the base end of the pipe nut main body 14a, the joining flange 14b does not hinder the assemblability of the reinforcing plates 14c. Then, by providing the joining flange 14b, the joining flange 14b can abut on the outer surface of the front side frame 6 to restrict the movement of the pipe nut main body 14a in the longitudinal direction. Furthermore, by joining the joining flange 14b to the outer surface of the front side frame 6 by spot welding, the fixing structure for the pipe nut 14 can ensure the attachment rigidity of the pipe nut 14 also from the outside of the front side frame 6.

Thus, the fixing structure for the pipe nut 14 can ensure the attachment rigidity by welding from the outside of the front side frame 6, in addition to welding from the inside of the front side frame 6. Therefore, the fixing structure for the pipe nut 14 can increase the attachment rigidity with respect to the front side frame 6.

In addition, the front side frame 6 has the pair of upper and lower inner flanges 12d protruding from the outer surface of the front side frame 6. When any one of the pair of rotation restricting portions 14h abuts on the inner flange 12d extending from the lower wall 12c, each of the reinforcing plates 14c extends in the direction orthogonal to the longitudinal direction of the front side frame 6. That is, by simply causing any one of the rotation restricting portions 14h to abut on the inner flange 12d, each of the reinforcing plates 14c can be disposed at an appropriate position in contact with the inner surface of the front side frame 6. This configuration improves workability in arc welding of the reinforcing plates 14c to the inner surface of the front side frame 6.

Furthermore, as described above, each of the reinforcing plates 14c extends in the direction orthogonal to the longitudinal direction inside the front side frame 6. Thus, each of the reinforcing plates 14c can accurately reinforce the front side frame 6. Therefore, the fixing structure for the pipe nut 14 can increase the attachment rigidity of the pipe nut 14 with respect to the front side frame 6 and the rigidity of the front side frame 6.

Further, each of the reinforcing plates 14c has a flat plate shape. With such a shape, it is possible to insert each of the reinforcing plates 14c into the front side frame 6 just by providing each of the slits 12f corresponding to the thickness of each of the reinforcing plates 14c in the lower wall 12c. Thus, it is possible to minimize the number of holes provided in each of the reinforcing plates 14c. Therefore, even with a structure in which the pipe nut main body 14a including the reinforcing plates 14c is inserted into the front side frame 6, it is possible to minimize a decrease in rigidity of the lower wall 12c.

Figure 7:
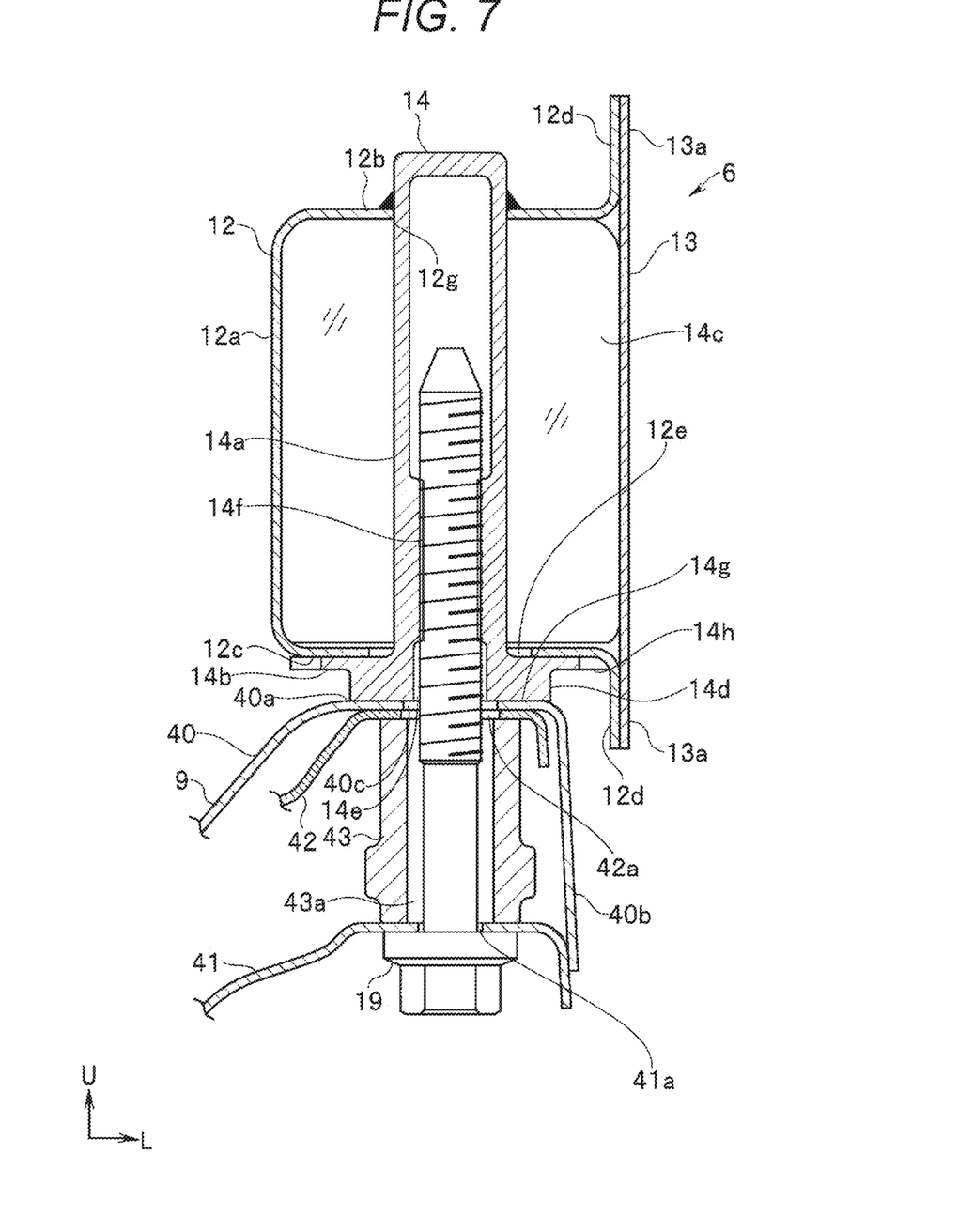
FIG. 7 is a cross-sectional view corresponding to FIG. 4 according to an embodiment.

FIG. 7 illustrates a second embodiment of the disclosure. Components similar to those in the first embodiment are denoted by similar reference numerals, and description thereof is simplified or omitted.

The pipe nut main body 14a of the first embodiment is disposed inside the front side frame 6.

On the other hand, the pipe nut main body 14a of the present embodiment penetrates the upper wall 12b of the front side frame 6 and protrudes upward. That is, a distal end of the pipe nut main body 14a of the present embodiment is different in that it is extended to the distal end side of the pipe nut main body 14a of the first embodiment.

Therefore, the upper wall 12b of the present embodiment is provided with an upper insertion hole 12g through which the distal end of the pipe nut main body 14a is inserted.

The pipe nut main body 14a inserted into the upper insertion hole 12g is rotatable around the central axis O of the pipe nut main body 14a. Therefore, the diameter of the upper insertion hole 12g is set slightly larger than the outer diameter of the pipe nut main body 14a.

Then, the distal end side of the pipe nut main body 14a inserted into the upper insertion hole 12g can be joined to the outer surface of the upper wall 12b by arc welding in a state of being inserted into the upper insertion hole 12g.

Thus, the fixing structure of the present embodiment can generate a higher drag with respect to loads in the prying direction and the longitudinal direction input to the pipe nut main body 14a via the suspension cross member 9 during traveling, as compared with the first embodiment. Therefore, the fixing structure of the present embodiment can further increase the attachment rigidity of the pipe nut 14 with respect to the front side frame 6.

Since the other configurations are similar to those of the first embodiment, the description thereof will be omitted.

Figure 8:
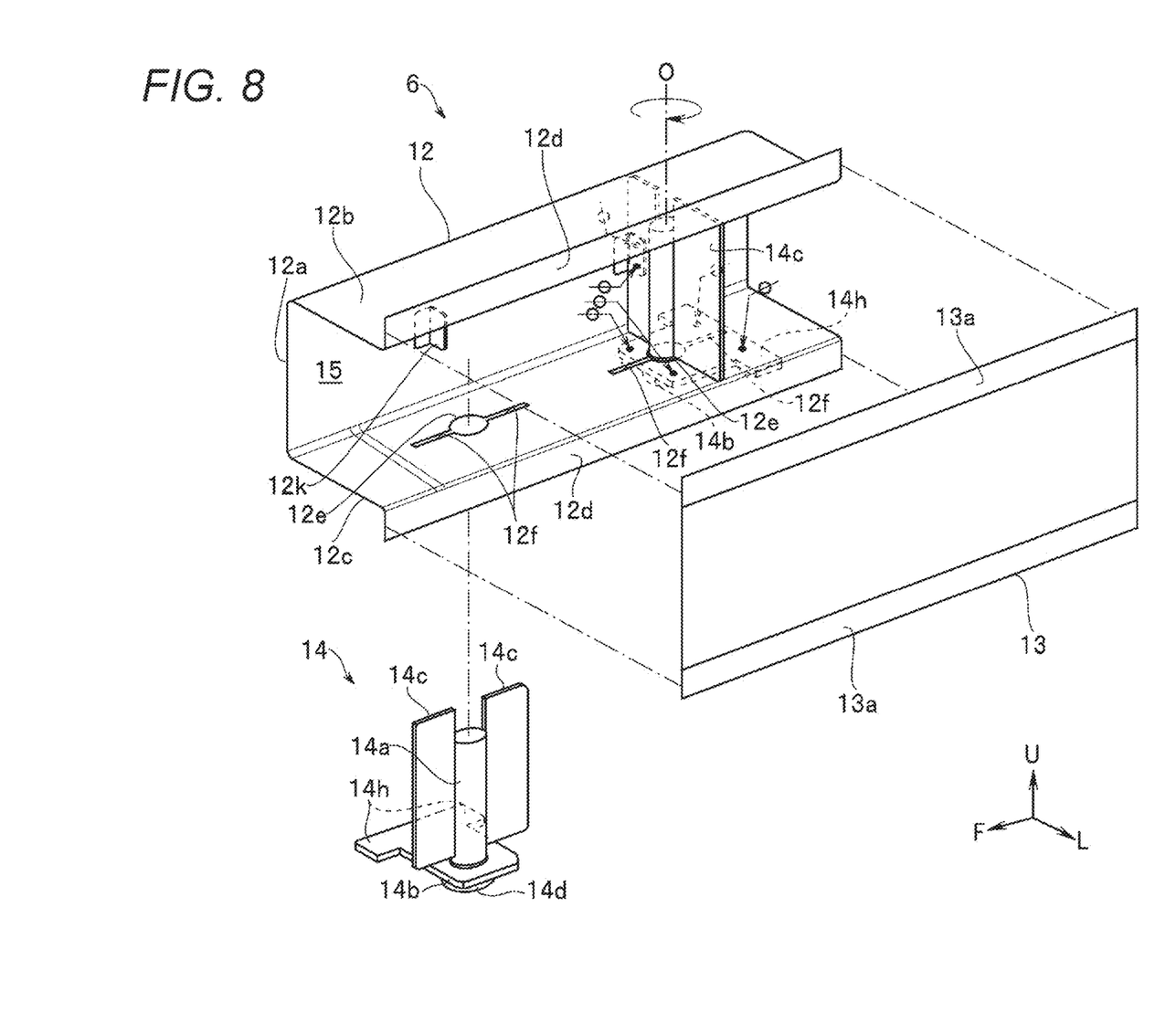
FIG. 8 is an enlarged exploded perspective view of a main part of a vehicle body frame according to an embodiment.
Figure 9:
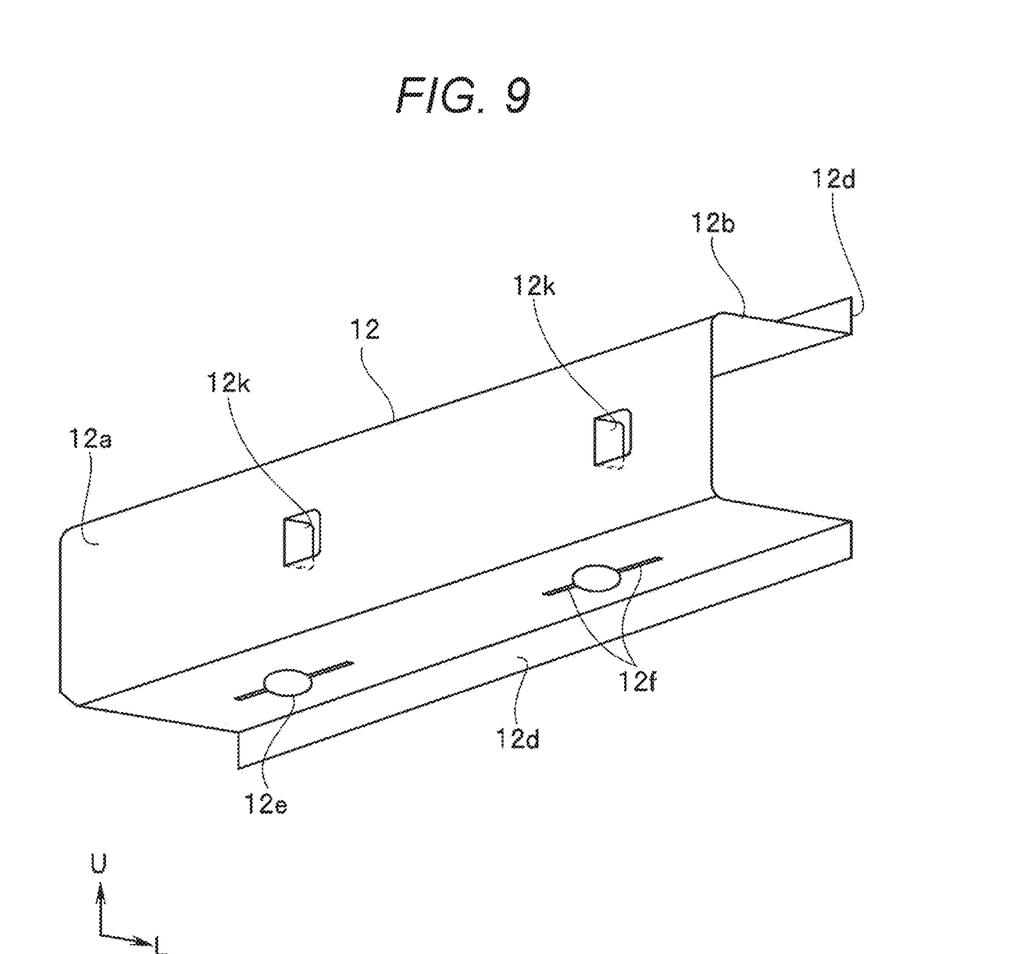
FIG. 9 is a perspective view of an inner frame according to the embodiment from an obliquely lower side.

FIGS. 8 and 9 illustrate a third embodiment of the disclosure. Components similar to those in the first and second embodiments are denoted by similar reference numerals, and description thereof is simplified or omitted.

The present embodiment is different from the first embodiment in that the front side frame 6 of the present embodiment is additionally provided with a joining portion 12k that is in surface contact with any one of the pair of reinforcing plates 14c.

The joining portion 12k protrudes inward from the inner wall 12a of the front side frame 6.

For example, as illustrated in FIG. 9, the joining portion 12k is provided near the center of the inner wall 12a in the vehicle body up-down direction so as to protrude from the inner wall 12a to the inside of the inner frame 12.

The joining portion 12k can be formed by a part of the plate material constituting the inner wall 12a. That is, the joining portion 12k is formed, for example, by providing a substantially U-shaped cut in a part of the plate material of the inner wall 12a. By bending the base portion of the formed joining portion 12k toward the inside of the inner frame 12 at a substantially right angle, the joining portion 12k protrudes into the front side frame 6. Thus, any one surface of the reinforcing plates 14c rotated around the central axis O of the pipe nut main body 14a can be brought into surface contact with the joining portion 12k.

When the reinforcing plate 14c comes into surface contact with the joining portion 12k, the rotation of the pipe nut 14 is restricted. In one embodiment, the joining portion 12k serves as a "second protrusion" that abuts on the reinforcing plate 14c to restrict the rotation of the pipe nut 14.

Further, when the reinforcing plate 14c abuts on the joining portion 12k by surface contact, each of the reinforcing plates 14c extends in the direction orthogonal to the longitudinal direction of the inner frame 12.

Then, in the abutted state, the reinforcing plate 14c is joined to the joining portion 12k by spot welding.

For example, in the present embodiment, spot welding is performed at two positions in the direction of the central axis O of the pipe nut main body 14a in a state where the reinforcing plate 14c abuts on the joining portion 12k.

With such a configuration, in the fixing structure of the present embodiment, the reinforcing plate 14c can be joined to the front side frame 6 by spot welding. Thus, the disclosure is not limited to the arc welding described above, and the reinforcing plate 14c can be joined to the front side frame 6 by spot welding. Therefore, the fixing structure of the present embodiment can further improve the assemblability of the pipe nut 14 with respect to the front side frame 6 depending on the vehicle type to be applied. Note that, in the present embodiment in which the reinforcing plate 14c can be extended in the direction orthogonal to the longitudinal direction of the inner frame 12 just by bringing the reinforcing plate 14c into surface contact with the joining portion 12k, the pair of rotation restricting portions 14h can be omitted.

Since the other configurations are similar to those of the first embodiment, the description thereof will be omitted.

Note that the disclosure described in the above embodiments (first to third embodiments) is not limited to those embodiments, and various modifications can be made in the implementation stage without departing from the gist thereof.

For example, the fixing structure of the pipe nut 14 described in each of the above embodiments (first to third embodiments) can also be used for a fastening portion between a vehicle body and a seat, a fastening portion between a vehicle body and a battery case mounted on an electric vehicle, or the like.

Furthermore, the above-described embodiments include inventions at various stages, and various inventions can be extracted by appropriately combining disclosed constituent elements.

Further, for example, when the problem to be solved in the disclosure can be solved and the described effect can be obtained even if some constituent elements are deleted from all the constituent elements described in the above embodiments, the configuration from which the constituent elements are deleted can be extracted as an invention.

The invention claimed is:

1. A fixing structure for a pipe nut that fixes a pipe nut main body to a vehicle body frame having a hollow cross section, the fixing structure comprising:
    an insertion hole provided in the vehicle body frame and through which the pipe nut main body is inserted in such a manner that the pipe nut main body is rotatable around a central axis of the pipe nut main body;
    a slit provided in the vehicle body frame and extending from the insertion hole;
    a first stopper that is provided at a base end of the pipe nut main body and abuts on an outer surface of the vehicle body frame to restrict movement of the pipe nut main body in a longitudinal direction; and
    a second stopper that extends from a side surface of the pipe nut main body, passes through the slit, and is disposed inside the vehicle body frame, wherein
    the second stopper is joined to an inner surface of the vehicle body frame at a position rotated around the central axis from the slit.

2. The fixing structure for a pipe nut according to claim 1, wherein
    the vehicle body frame includes a first protrusion protruding from the outer surface, and when the first stopper abuts on the first protrusion, the second stopper extends in a direction orthogonal to a longitudinal direction of the vehicle body frame.

3. The fixing structure for a pipe nut according to claim 1, wherein
    the vehicle body frame includes a second protrusion protruding toward an inside of the vehicle body frame, and
    when the second stopper abuts on the second protrusion, the second stopper extends in a direction orthogonal to a longitudinal direction of the vehicle body frame.

4. The fixing structure for a pipe nut according to claim 3, wherein the first stopper is joined to the outer surface of the vehicle body frame by spot welding.

5. The fixing structure for a pipe nut according to claim 2, wherein the first stopper is joined to the outer surface of the vehicle body frame by spot welding.

6. The fixing structure for a pipe nut according to claim 1, wherein a distal end of the pipe nut main body protrudes through the vehicle body frame.

7. The fixing structure for a pipe nut according to claim 6, wherein the first stopper is joined to the outer surface of the vehicle body frame by spot welding.

8. The fixing structure for a pipe nut according to claim 1, wherein the first stopper is joined to the outer surface of the vehicle body frame by spot welding.

* * * * *